Feb. 23, 1943.   J. E. BUXTON   2,311,894
ENGINE STARTER DRIVE
Filed Jan. 23, 1941
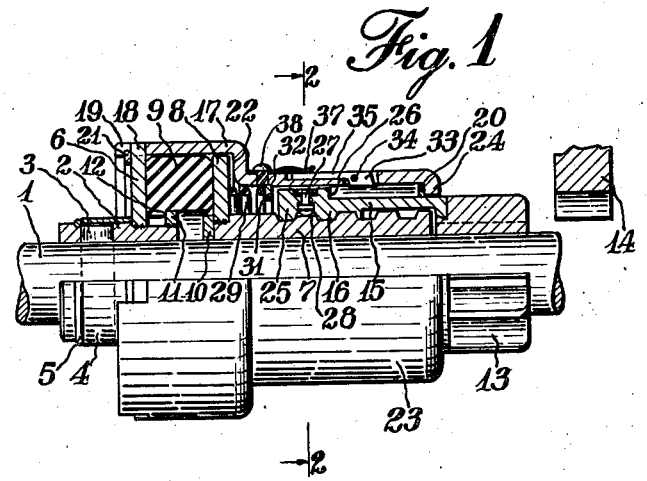
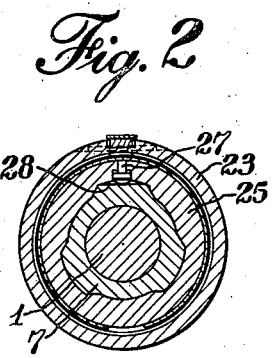
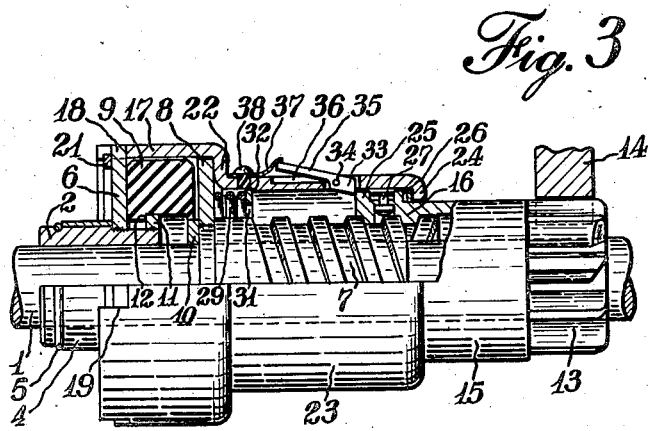
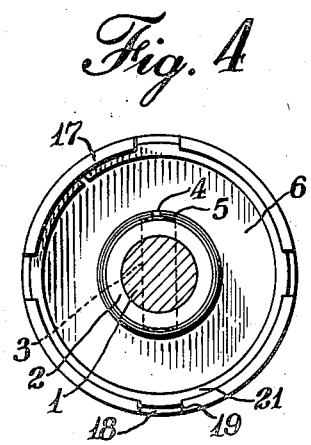
Witness:
Burr W. Jones
INVENTOR.
James E. Buxton
BY Clinton S. Janes
ATTORNEY.

Patented Feb. 23, 1943

2,311,894

UNITED STATES PATENT OFFICE 2,311,894

ENGINE STARTER DRIVE

James E. Buxton, Elmira Heights, N. Y., assignor to Bendix Aviation Corporation, South Bend, Ind., a corporation of Delaware Application January 23, 1941, Serial No. 375,636

11 Claims. (Cl. 74—7)

The present invention relates to an engine starter drive and more particularly to that type of drive adapted to maintain the parts in operative position until the engine has become continuously self-operative.

It is an object of the present invention to provide a novel engine starter gear which automatically connects a starting motor with a member of an engine to be started upon actuation of the starting motor, and which maintains the gearing in operative position as long as the starting motor is energized.

It is another object to provide such a device which permits the gearing to overrun freely when the engine becomes self-operative.

It is another object to provide such a device which maintains the gear connection to the engine as long as the starting motor is rotating above a predetermined speed.

It is another object to provide such a device which incorporates an overrunning clutch between the starting motor and the automatic connecting means.

It is another object to provide such a device incorporating a yielding driving connection which also serves as the overrunning clutch.

It is another object to provide such a device incorporating an auxiliary frictional driving connection.

It is another object to provide such a device which is short and of small diameter so as to be adapted for use in restricted spaces.

Further objects and advantages will be apparent from the following description taken in connection with the accompanying drawing in which:

Fig. 1 is a side elevation partly in section of a preferred embodiment of the invention showing the parts in idle or normal position;

Fig. 2 is a section taken substantially on the line 2—2 of Fig. 1;

Fig. 3 is a view similar to Fig. 1 showing the parts in the positions assumed when the engine becomes self-operative, before deenergization of the starting motor; and Fig. 4 is an end view from the left in Fig. 1.

In Fig. 1 of the drawing there is illustrated a power shaft 1 which may be the extended armature of a starting motor, not illustrated. A driving head 2 is fixed on the power shaft 1 by suitable means such as a cross pin 3 which is held in position by a sleeve 4 locked by a split wire ring 5. A driving flange 6 is rigidly mounted on the driving head 2 as by welding or brazing.

A screw shaft 7 having a flange 8 at one end rigidly mounted thereon as by welding or brazing, is slidably journalled on the power shaft 1, and a cylindrical block of elastically deformable material 9 is interposed between the flanges 6 and 8 and is normally maintained in engagement with the flange 6 by means of a radial flange 11 fixed as by brazing on the drive head 2 and arranged to engage an interior shoulder 12 in the elastic block.

Means are preferably employed to limit the compression of the block 9 and to form an auxiliary frictional driving connection. For this purpose a washer 10 of fibre or other suitable material is interposed between the adjacent ends of the drive head 2 and screw shaft 7.

A pinion 13 is slidably journalled on the power shaft 1 for longitudinal movement into and out of engagement with a member such as a gear 14 of an engine to be started. A barrel member 15 is rigidly connected at one end to the pinion 13 and is formed interiorly with a thread 16 adapted to cooperate with the thread on the exterior of the screw shaft 7.

A barrel member 17 is arranged to surround the flanges 6 and 8 and the elastic block 9, and is rigidly connected to the flange 6 as by means of radial lugs 18 on the flange retained in slots 19 in the end of the barrel by means of a lock ring 21. Barrel 17 is constricted beyond the flange 8 in order to form a shoulder 22 which limits the separation of the flanges 6 and 8. The barrel extends axially from the shoulder 22 as shown at 23 so as to surround the pinion barrel 15 and is provided at its end with an inturned flange 24. The pinion barrel 15 is provided with an enlarged portion 25 near its free end forming a shoulder 26 which is adapted to engage the flange 24 to limit the longitudinal travel of the pinion and thereby define its operative position. An anti-friction thrust washer 20 may be interposed between the flange 24 and the shoulder 26 to reduce wear thereof.

Means for normally retaining the pinion and its barrel in idle position is provided in the form of an anti-drift detent 27 mounted in the enlarged portion 25 of the pinion barrel and bearing on the exterior of the screw shaft which may be flattened as indicated at 28 (Fig. 2) where the detent engages it when the pinion is in idle position. Means for yieldably urging the flange 8 into light frictional engagement with the elastic block 9 is provided in the form of a spring 29 which bears against said flange and against a thrust ring 31 seated against a shoulder 32 in the interior of the restricted portion 23 of barrel 17.

According to the present invention, means are provided for holding the pinion in engagement with the engine gear as long as the starting motor is rotating above a predetermined speed. As here shown, this means is in the form of a latch 33 pivoted at 34 in the portion 23 of barrel 17 in position to project into the barrel back of the pinion barrel 15 when the pinion is in cranking position. Latch 33 is provided with an arm 35 which is normally held in a recess 36 (Fig. 3) in the barrel portion 23 by means of a spring 37 anchored at 38 to said barrel portion. When the barrel 17 is rotating above a predetermined speed, however, centrifugal force acting on the arm 35 causes it to move out as shown in Fig. 3, projecting the nose of the latch into the path of the pinion barrel 15 whereby said pinion barrel is prevented from returning to idle position.

In operation, starting with the parts in the positions illustrated in Fig. 1, actuation of the power shaft 1 by the starting motor causes rotation of the driving head 2, flange 6, block 9 and barrel 17, and also causes rotation of the screw shaft 7 by virtue of its frictional engagement with the power shaft and also the frictional engagement of the flange 8 with the elastic block 9. Rotation of the screw shaft causes the pinion barrel 15 to move the pinion axially into engagement with the engine gear 20 until the shoulder 26 on the pinion barrel engages the flange 24. When the longitudinal movement of the pinion and barrel is thus stopped, the screw shaft 7 is caused to move back, pressing the flange 8 against the elastic block 9 by reason of the screw jack action of the pinion barrel and screw shaft until sufficient torque is transmitted through the elastic block to cause the pinion 13 to crank the engine. When the fibre washer 10 is employed to limit the compression of the elastic block, the longitudinal movement of the screw shaft is arrested thereby after a predetermined load has been placed on the block, after which the washer forms a friction clutch connection between the drive head 2 and screw shaft 7.

The initial explosions of the engine cause the engine gear to accelerate the pinion 13 whereby it overruns the power shaft and causes the pinion barrel 15 to draw the screw shaft 7 away from the elastic block 9. The pinion, pinion barrel and screw shaft are thereby freed from the power shaft and may overrun freely as long as the engine remains self-operative. During this time, the rotation of the power shaft 1 at or above cranking speed causes the latch 33 to be projected into the path of the pinion barrel 15 as shown in Fig. 3, whereby the pinion is maintained in mesh with the engine gear.

Should the engine fail to continue in operation after the first few explosions, the consequent deceleration of the engine gear permits the power shaft as rotated by the starting motor, to catch up with the pinion and resume the cranking operation as previously described.

When the engine becomes continuously self-operative, the starting motor is deenergized by the operator. The consequent deceleration of the driving head 2 and barrel 17 permits the spring 37 to return the latch 35 to its idle position. The pinion barrel 15 is thus permitted to travel back along the screw shaft 7, returning the pinion to normal position.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive, a power shaft, a pinion slidably journalled thereon for movement into and out of engagement with a gear of an engine to be started, screw and nut means for moving the pinion into engagement with the engine gear, means including an overrunning clutch device for connecting the screw and nut means to the power shaft, and means for holding the pinion in engagement with the engine gear while the power shaft is rotating above a predetermined speed.

2. In an engine starter drive, a power shaft, a pinion slidably journalled thereon for movement into and out of engagement with a gear of an engine to be started, screw and nut means for moving the pinion into engagement with the engine gear, a yielding driving connection including an overrunning clutch device for connecting the screw and nut means to the power shaft, and centrifugal means rotatable by the power shaft for holding the pinion in engagement with the engine gear while the power shaft is rotating above a predetermined speed.

3. In an engine starter drive, a power shaft, a pinion slidably journalled thereon for movement into and out of engagement with a member of an engine to be started, a screw shaft slidably journalled on the power shaft, a nut threaded on the screw shaft fixed to the pinion, a flange member fixed to the power shaft, a flange fixed to the screw shaft, a block of elastically deformable material interposed between said flanges, a barrel member surrounding the flanges and elastically deformable material and having stop means for defining the operative position of the pinion, and a latch in the barrel movable by centrifugal force to hold the pinion in operative position.

4. In an engine starter drive, a power shaft, a pinion slidably journalled thereon for movement into and out of engagement with a member of an engine to be started, a screw shaft slidably journalled on the power shaft, a nut threaded on the screw shaft fixed to the pinion, a flange member fixed to the power shaft, a flange fixed to the screw shaft, a block of elastically deformable material interposed between said flanges, a barrel member surrounding the flanges and elastically deformable material and having stop means for defining the operative position of the pinion, and means carried by the barrel engaging the nut to hold the pinion in engagement with the engine gear as long as the barrel rotates above a predetermined speed.

5. In an engine starter drive, a power shaft, a pinion slidably journalled thereon for movement into and out of engagement with a member of an engine to be started, a screw shaft slidably journalled on the power shaft, a nut threaded on the screw shaft fixed to the pinion, a flange member fixed to the power shaft, a flange fixed to the screw shaft, a block of elastically deformable material interposed between said flanges, a barrel member fixed to the power shaft surrounding the flanges and elastic block and having stop means for defining the operative position of the pinion, and a centrifugal latch mounted in the barrel and movable by rotation of the barrel above a predetermined speed to hold the pinion in engagement with the engine member.

6. In an engine starter drive, a power shaft, a pinion slidably journalled thereon for movement into and out of engagement with a member of an engine to be started, means for actuating the pinion from the power shaft including a pair of flange members and a block of elastically deformable material loosely interposed therebetween, a barrel member enclosing the flange members and elastic block and having a stop defining the operative position of the pinion, and centrifugal means in the barrel for holding the pinion in operative position.

7. In an engine starter drive, a power shaft, a pinion slidably journalled thereon for movement into and out of engagement with a member of an engine to be started, means for actuating the pinion from the power shaft including a pair of flange members and a block of elastically deformable material loosely interposed therebetween, means normally maintaining the flange members in light frictional engagement with the elastic block, torque-responsive means for compressing the flanges against the elastic block, a barrel member fixed to the power shaft enclosing the flange members and elastic block and having a stop defining the operative position of the pinion, and centrifugal means in the barrel for holding the pinion in operative position.

8. In an engine starter drive, a power shaft, a pinion slidably journalled thereon for movement into and out of engagement with an engine member, screw and nut means for traversing the pinion, an overrunning yielding driving connection from the power shaft to said means, an auxiliary frictional connection established after a predetermined load is applied to the yielding driving connection, and means for holding the pinion in engagement with the engine member while the power shaft is rotating above a predetermined speed.

9. In an engine starter drive a power shaft, a pinion slidably journalled thereon for movement into and out of engagement with a member of an engine to be started, means for traversing and rotating the pinion including a screw shaft, an overrunning clutch connection between the power shaft and screw shaft, and a threaded connection between the screw shaft and the pinion; and means for holding the pinion in engagement with the engine member regardless of the speed of rotation of the pinion, as long as the power shaft rotates above a predetermined speed.

10. An engine starter drive as set forth in claim 9 in which said holding means comprises a latch movable by centrifugal force into position to prevent retraction of the pinion from operative position, and means for connecting the latch to rotate with the power shaft.

11. An engine starter drive as set forth in claim 9 in which said overrunning clutch comprises a body of elastically deformable material and means actuated by the screw jack action of the screw shaft and nut to compress and torque said body during cranking and to release said body when the pinion overruns the power shaft.

JAMES E. BUXTON.